United States Patent Office 2,912,766
Patented Nov. 17, 1959

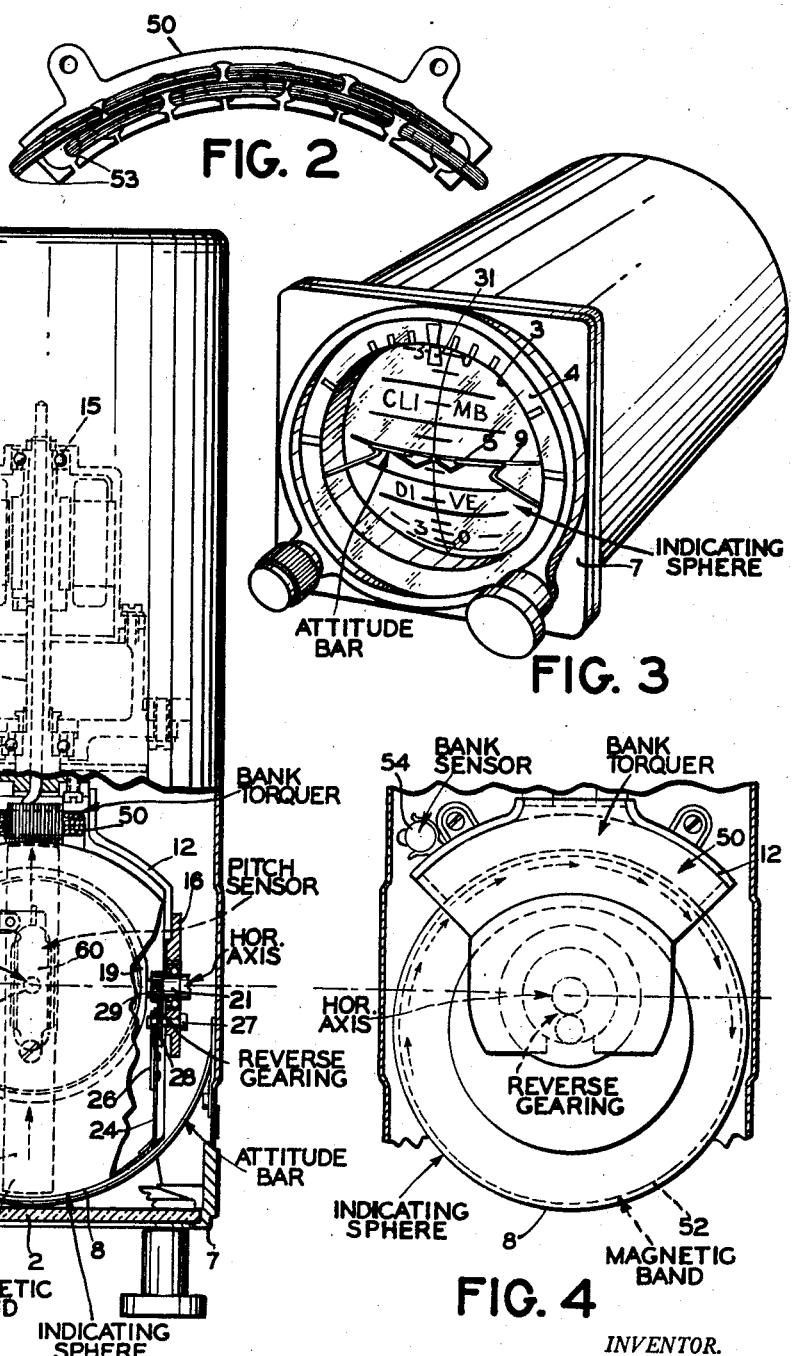

2,912,766

VERTICAL GYRO HAVING AN IMPROVED TORQUING DEVICE FOR ACTUATING A SPHERICAL INDICATOR GEARED TO THE GYRO

Charles E. Hurlburt, River Edge, N.J., assignor to Bendix Aviation Corporation, Teterboro, N.J., a corporation of Delaware Application November 6, 1957, Serial No. 694,800

5 Claims. (Cl. 33—204)

This invention relates to an improved means for applying torque to a vertical gyro of a type including a spherical indicator geared to the gyro as described and claimed in copending U.S. application Serial No. 535,358, filed September 20, 1955, by Charles E. Hurlburt and assigned to Bendix Aviation Corporation.

More particularly the present invention provides a novel means for applying torque to a vertical gyro about its horizontal axis and so arranged that the gyro may be mounted within a casing having extremely limited space available for a bank torquer, i.e., one which precesses the gyro in bank.

An object of the invention is to provide a torquer which will perform the desired function without encroaching on the space necessary for adequate gyroscopic momentum.

Another object of the invention is to provide a novel bank torquer arrangement in which an indicating sphere of a light material of high electrical conductivity, geared to the gyro, is utilized as the rotor of a bank torquer for the gyro by providing a strip or band of magnetic material secured to the sphere and extending circumferentially within the sphere and in cooperative relation with an electromagnetic type segmental torquer mounted in the horizontal gimbal of the gyro and about the horizontal axis of the gyro so as to provide an eddy current motor torque controlled by a bank sensor switch and cooperating with the magnetic band in such a manner as to maintain the band in a vertical plane with the gyro spin axis.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

Figure 1 is a plan view of a gyroscopic instrument embodying the invention, with parts cut away and certain parts shown in section for better illustration thereof.

Figure 2 is an enlarged side view of a segmental torquer embodied in the present invention.

Figure 3 is a front elevational view of the indicating device.

Figure 4 is a side elevational view of the torquer and indicating sphere assembly of Figure 1 with certain parts broken away.

Reference is now directed to the drawings, wherein there is shown in an instrument embodying the invention an elongated can or casing 1 in which the instrument is contained. The can is closed at its open or viewing end by a vertically disposed bezel window 2. Rearwardly of the window, is fixed a dial plate 3 having a circular open central area about which borders a radially narrow dial face 4 divided off into degrees as shown in Figure 3. Extending horizontally across the open area of plate 3 is an attitude bar 5 which coincides with the 90° markings on the dial face in normal flight. The bar 5 is supported from the wall of casing 1.

The can is intended to be fixed in the instrument panel of an aircraft in a level position and so that the dial face fronts the pilot. A bezel frame 7 fronting the window 2 accommodates bolts for securing the instrument in the instrument panel of the aircraft.

In the close proximity to the rear of the bezel window and the dial face is a truncated spherical shell 8 of very light weight material such as aluminum. The upper half of the face portion of this sphere is suitably colored as blue to indicate sky. The lower half of the sphere is suitably colored as brown to indicate the earth. The division point of the colored sections provides a horizon line 9 which has a normal position, when the instrument is level (Fig. 3) coinciding with the attitude bar.

The truncated sphere 8 functions to roll or rotate on a horizontal axis as the plane pitches so as to indicate climbing and diving attitudes of the plane. Lateral markings in contrasting colors on the respective colored areas of the sphere serve to indicate the degree of pitch relative to the attitude bar as the sphere rolls on its horizontal axis.

Rotation of the sphere is gyro controlled. The gyroscope mechanism for this purpose is housed in the can 1, and only so much thereof as is believed will illustrate the invention herein has been shown in the drawings. It includes an outer gimbal member 12 having a longitudinal axis defined by an elongated shaft 14 axially mounted in suitable housing supported bearings 15 for 360° rotation. Unitary with one end of shaft 14 is a yoke piece having a pair of laterally spaced parallel arms 16. The arms open out toward the bezel end of the instrument.

Located within the sphere 8 is a vertical gyro, the bearing frame or casing of which is partially shown at 19. The horizontal axis of the bearing frame is defined by trunnions 21, 22 which project from opposite sides of the frame through open sides of the sphere 8. These trunnions are supported for rotation in suitable bearings carried in the gimbal arms 16. The structure of the gyro 19, not being necessary to an understanding of this invention, will be assumed to be electrically driven and to have a spin axis 23 which is normally vertical to the horizontal axis of the bearing frame. A line extension of the longitudinal axis of the gimbal shaft 14 is perpendicular to the horizontal axis of the trunnions 21, 22.

The sphere 8 is mounted upon a pair of opposed brackets 24, each of which supports the sphere in its interior forward and polar regions. The brackets have rearwardly extending arm portions 26, each of which pivots on a pin 27. The latter project inwardly from each gimbal arm 16. These pins are located forwardly of the gyro frame trunnions and are in close spaced relation thereto. The pivot pins 27 define a horizontal axis for pivotal movement of the sphere 8.

A gear 28, coaxial with the pivot point of bracket arm 26 is fixed to the latter. This gear is in mesh with a pinion gear 29 formed on the right trunnion of the gyro bearing frame. The arrangement of the gears to one another and to the sphere is such that, in horizontal flight of the aircraft, the sphere is held by the gears to its normal position on its horizontal axis, wherein the horizon line 9 on the visible face of the sphere is level, coinciding with the attitude bar 5.

In the operation of the device, it is clear that in a climb of the aircraft, the sphere 8 will pivot about pinion gear 29 in a downward direction causing the horizon line 9 to descend below the attitude bar 5; and that in a dive of the plane, the sphere 8 will pivot about pinion gear 29 in an upward direction causing the horizon line to rise above the attitude bar. It is plain, that by this arrangement the earth colored portion of the sphere will appear to rise to meet the pilot as he dives, and will appear to drop away as the pilot climbs. The degree that the sphere is pivoted above or below the attitude bar is indicated to the pilot by the lattitude markings on the face of the sphere, as well as by the amount of the sky or earth portion of the sphere exposed through the window. In banking maneuvers, the direction and degree thereof are indicated on the dial to the pilot by an index finger 31 (Fig. 3) carried by a bracket not shown fixed to the gimbal arms 16, and as explained in the copending application Serial No. 535,358, due to the actions of the gyro the position of this finger is stabilized while the marked dial 3 of the instrument rotates relative thereto as the aircraft rotates on its longitudinal axis in banking maneuvers.

The foregoing structure forms the subject matter of my copending application Serial No. 535,358, filed September 20, 1955, while the present invention is directed to improvements therein particularly in the provision of a novel means for applying torque to the vertical gyroscope so as to correct for deviations in the spin axis thereof.

To effect the foregoing, the aluminum sphere 8 geared to the gyro, is utilized as the rotor of a bank torquer indicated generally by the numeral 50. This is accomplished by fastening a strip or band 52 of magnetic material circumferentially around the inner surface of the aluminum sphere 8, as best shown in Figures 1 and 4.

The plane of the magnetic band 52 is in the same plane as that of the bank torquer 50 which is shown in Figures 1 and 4 in the form of an electromagnetic type segmental torquer mounted in the outer horizontal gimbal 12. The torquer 50 is of a conventional type shown in detail in Figure 2 and having suitable windings 53, the energization of which is controlled by a bank sensor liquid level switch element 54, also of conventional type, mounted on the gimbal 12, as shown in Figure 4, and arranged to effect energization of the torquer 50 to effect corrective precession upon upon the spin axis 23 of the gyro deviating from a true vertical by a predetermined value.

It will be seen from the foregoing arrangement that the aluminum sphere 8 is in the magnetic gap between the bank torquer 50 and the magnetic band 52 in the rotor or indicating sphere 8. The eddy current motor torque developed by this combination under control of the bank sensor switch 54 is such as to precess the gyro into maintaining the plane of the band 52 in a vertical plane with that of the gyro sphere axis.

A second pitch sensor liquid level switch 60 is positioned in a conventional manner on the gyro housing and is so arranged as to control energization of a pitch torquer motor 62 of conventional type and operating on the bank axis through the shaft 14 in such a manner as to maintain the spin axis 23 of the gyro in a vertical plane.

The aforedescribed arrangement provides a novel means for packaging a gyro within a casing having extremely limited space requirements in that the bank torquer 50 is arranged to cooperate with the indicating sphere 8 through the band 52 and thereby with the gyro 19 geared to the sphere 8 so as to precess the gyro in bank.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a gyro controlled instrument for use in an aircraft, the combination comprising a gimbal pivotable on a first axis, an indicator sphere pivotable on a second axis carried by said gimbal, a gyro bearing casing rotatable on a third axis carried by said gimbal in parallel spaced relation to the second axis, said third axis extending perpendicular to said first axis, means operatively connecting the sphere to the gyro bearing casing for effecting pivotal movement of the sphere on the second axis, electromagnetic means carried by said gimbal, and said sphere including means cooperating with said electromagnetic means to apply a torque to said sphere about said second axis and through said operative connecting means a torque about the third axis of the gyro bearing casing.

2. The combination defined by claim 1 including a band of ferromagnetic material affixed to the sphere in cooperative relation with the electromagnetic means to effect the application of the torque about the third axis of the gyro bearing casing.

3. The combination defined by claim 2 including an arcuate electromagnetic means carried by the gimbal and extending partially about the sphere, said arcuate electromagnetic means being positioned in the plane of the band of ferromagnetic material, and switch means sensitive to a banking maneuver of the aircraft to effect energization of the electromagnetic means and thereby the application of torque through said band and about the third axis of the gyro bearing casing to precess the gyro in bank.

4. For use in a gyro controlled aircraft instrument of type having a gimbal pivotable on a longitudinal axis, an indicator sphere pivotable on a first horizontal axis carried by said gimbal, a gyro bearing casing rotatable on a second horizontal axis carried by said gimbal in parallel spaced relation to the first-mentioned horizontal axis, and means operatively connecting the indicator sphere to the gyro bearing casing for effecting pivotal movement of the sphere on the first horizontal axis; the improvement comprising an arcuate electromagnetic core element, exciting windings for energizing the electromagnetic core element, said arcuate electromagnetic core element extending partially around the sphere, a band of ferromagnetic material affixed to the sphere and positioned in the plane of the core element in cooperative relation therewith, and switch means sensitive to a banking maneuver of the aircraft to effect energization of said exciting windings and through the electromagnetic core element the application of a torque to the band and through said sphere and said operative connecting means a torque about the second horizontal axis of the gyro bearing casing to precess the gyro in bank.

5. In a gyro controlled instrument of a type having a gimbal pivotable on a first axis, a gyro bearing element pivotable on a second axis carried by said gimbal and extending in perpendicular relation to the first axis, an indicator member, and means operatively connecting the indicator member to the gyro bearing element to effect movement of the indicator member in response to pivotal movement of the gyro bearing element on the second axis; the improvement comprising electromagnetic means carried by said gimbal, and said indicator member including means cooperating with said electromagnetic means to apply a torque to said indicator member and through said operative connecting means a torque to said gyro bearing element about the second axis.

References Cited in the file of this patent

UNITED STATES PATENTS 2,492,992     Handel _____ Jan. 3, 1950

FOREIGN PATENTS 918,604     France _____ Oct. 28, 1946